US 011732656B2

(12) United States Patent
Binek et al.

(10) Patent No.: US 11,732,656 B2
(45) Date of Patent: Aug. 22, 2023

(54) TURBINE ENGINE WITH SOARING AIR CONDUIT

(71) Applicant: Raytheon Technologies Corporation, Farmington, CT (US)

(72) Inventors: Lawrence A. Binek, Glastonbury, CT (US); Matthew E. Lynch, Canton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 30 days.

(21) Appl. No.: 17/219,207

(22) Filed: Mar. 31, 2021

(65) Prior Publication Data

US 2022/0316408 A1    Oct. 6, 2022

(51) Int. Cl.
| F01D 9/02 | (2006.01) |
| F02C 9/18 | (2006.01) |
| F01D 25/12 | (2006.01) |
| F01D 25/24 | (2006.01) |
| F02C 7/18 | (2006.01) |

(52) U.S. Cl.
CPC ............... F02C 9/18 (2013.01); F01D 9/02 (2013.01); F01D 25/12 (2013.01); F01D 25/24 (2013.01); F02C 7/18 (2013.01); F05D 2220/32 (2013.01)

(58) Field of Classification Search
CPC ...... F02C 9/18; F02C 7/18; F01D 9/02; F01D 25/12; F01D 25/24; F05D 2220/32
See application file for complete search history.

(56) References Cited

U.S. PATENT DOCUMENTS

| 3,751,909 | A | * | 8/1973 | Kohler | F01D 5/148 |
| | | | | | 415/117 |
| 4,157,010 | A | * | 6/1979 | Sailer | F02C 9/18 |
| | | | | | 60/774 |
| 4,576,547 | A | * | 3/1986 | Weiner | F01D 11/24 |
| | | | | | 60/726 |
| 5,048,288 | A | * | 9/1991 | Bessette | F01D 11/24 |
| | | | | | 415/116 |
| 5,134,844 | A | | 8/1992 | Lee | |
| 5,394,687 | A | * | 3/1995 | Chen | F01D 9/02 |
| | | | | | 60/785 |
| 7,568,343 | B2 | | 8/2009 | Harris | |

(Continued)

OTHER PUBLICATIONS

"Cutaway drawing V2500", Jan. 14, 2014, https://prattwhitney.com/-/media/project/pw/pw-internet/pwu/pwu/products/commercial/v2500-engine-cutaway.jpg?rev=336b7e3363b34ab9bb8d2938454358b6.
EP search report for EP22164811.6 dated Aug. 19, 2022.

*Primary Examiner* — David E Sosnowski
*Assistant Examiner* — Theodore C Ribadeneyra
(74) *Attorney, Agent, or Firm* — Getz Balich LLC

(57) ABSTRACT

An assembly is provided for a turbine engine. This turbine engine assembly includes a case structure and an air conduit. The case structure extends circumferentially about and axially along an axis. The air conduit has a conduit centerline, a conduit first end and a conduit second end. The air conduit extends longitudinally along the conduit centerline between the conduit first end and the conduit second end. The conduit first end is connected to the case structure at a first location. The conduit second end is connected to the case structure at a second location. The air conduit is displaced from the case structure longitudinally between the conduit first end and the conduit second end. At least a majority of the conduit centerline follows a non-straight trajectory.

18 Claims, 9 Drawing Sheets

(56) References Cited

U.S. PATENT DOCUMENTS

| | | | | |
|---|---|---|---|---|
| 7,669,425 | B2* | 3/2010 | Liang | F01D 5/088 |
| | | | | 415/115 |
| 8,240,979 | B2 | 8/2012 | Jain | |
| 8,973,371 | B2* | 3/2015 | King | F02C 3/13 |
| | | | | 60/785 |
| 9,562,475 | B2* | 2/2017 | Laurello | F02C 6/08 |
| 9,714,611 | B2* | 7/2017 | Mayer | F01D 25/26 |
| 10,415,395 | B2* | 9/2019 | Taheny | F01D 5/082 |
| 2006/0104805 | A1* | 5/2006 | Gummer | F04D 27/0215 |
| | | | | 415/58.5 |
| 2010/0175387 | A1* | 7/2010 | Foust | F02C 7/185 |
| | | | | 60/785 |
| 2013/0111919 | A1* | 5/2013 | Chehab | F01D 25/10 |
| | | | | 60/39.01 |
| 2014/0230441 | A1 | 8/2014 | Mayer | |
| 2014/0311157 | A1* | 10/2014 | Laurello | F02C 6/08 |
| | | | | 60/785 |
| 2017/0059161 | A1* | 3/2017 | Cheung | F23R 3/425 |
| 2017/0276141 | A1* | 9/2017 | Saxena | F04D 29/542 |
| 2018/0266692 | A1* | 9/2018 | Patel | F23R 3/28 |
| 2018/0320801 | A1 | 11/2018 | Yang | |
| 2019/0242264 | A1* | 8/2019 | Goulds | F01D 25/162 |
| 2019/0341965 | A1 | 11/2019 | Snyder | |
| 2019/0360404 | A1* | 11/2019 | Staudte | F02C 9/18 |
| 2019/0383220 | A1* | 12/2019 | Mackin | F02C 9/18 |
| 2020/0011455 | A1* | 1/2020 | Jonnalagadda | F16L 9/19 |
| 2020/0018240 | A1* | 1/2020 | Galle | F02C 6/20 |
| 2020/0040847 | A1* | 2/2020 | Filipenco | F01D 25/24 |
| 2020/0109663 | A1 | 4/2020 | Binek | |
| 2020/0116041 | A1* | 4/2020 | Plante | F02C 3/145 |
| 2020/0141327 | A1 | 5/2020 | Redford | F02C 3/04 |
| 2020/0182081 | A1* | 6/2020 | Sidorovich Paradiso | F01D 17/14 |
| 2020/0232393 | A1* | 7/2020 | Bulot | F02C 7/18 |
| 2020/0240641 | A1* | 7/2020 | Pikovsky | F23R 3/28 |
| 2020/0347728 | A1 | 11/2020 | Binek | |

\* cited by examiner

TURBINE ENGINE WITH SOARING AIR CONDUIT

BACKGROUND OF THE DISCLOSURE

1. Technical Field

This disclosure relates generally to a turbine engine and, more particularly, to a cooling system for a turbine engine.

2. Background Information

A turbine engine typically includes a cooling system for cooling one or more internal components of the turbine engine. For example, it is known to air cool a turbine vane with compressed air. However, bleeding air from a compressor of the turbine engine decreases efficiency of the turbine engine, particularly where the cooling air is routed through a tortuous path within an engine casing. There is a need in the art therefore for improved systems for providing cooling air to internal components of a turbine engine.

SUMMARY OF THE DISCLOSURE

According to an aspect of the present disclosure, an assembly is provided for a turbine engine. This turbine engine assembly includes a case structure and an air conduit. The case structure extends circumferentially about and axially along an axis. The air conduit has a conduit centerline, a conduit first end and a conduit second end. The air conduit extends longitudinally along the conduit centerline between the conduit first end and the conduit second end. The conduit first end is connected to the case structure at a first location. The conduit second end is connected to the case structure at a second location. The air conduit is displaced from the case structure longitudinally between the conduit first end and the conduit second end. At least a majority of the conduit centerline follows a non-straight trajectory.

According to another aspect of the present disclosure, another assembly is provided for a turbine engine. This turbine engine assembly includes a case structure and an air conduit. The case structure extends circumferentially about and axially along an axis. The air conduit has a conduit centerline, a conduit first end and a conduit second end. The air conduit extends longitudinally along the conduit centerline from the conduit first end to the conduit second end. The conduit first end is connected to the case structure at a first location. The conduit second end is connected to the case structure at a second location that is circumferentially displaced from the first location about the axis. An intermediate portion of the air conduit, longitudinally between the conduit first end and the conduit second end, is radially separated from the case structure.

According to still another aspect of the present disclosure, another assembly is provided for a turbine engine. This turbine engine assembly includes a case structure, a compressor section, a stator vane and an air conduit. The case structure extends circumferentially around and axially along an axis. The compressor section is at least partially housed within the case structure. The stator vane is downstream of the compressor section. The stator vane is within the case structure. The stator vane is configured with a plurality of internal passages. The air conduit is configured to receive bleed air from the compressor section and direct the received bleed air to the internal passages. At least an intermediate portion of the air conduit is displaced radially outboard from the case structure.

More than fifty percent of the conduit centerline may follow a curved trajectory.

The turbine engine assembly may also include a compressor section and a turbine vane. The compressor section is at least partially housed within the case structure. The turbine vane is configured with one or more internal passages. The air conduit is fluidly coupled with and between the compressor section and the one or more internal passages.

The non-straight trajectory may be a continuously curved trajectory.

An entirety of the conduit centerline may follow the non-straight trajectory.

The conduit centerline may be angularly offset from the case structure at the conduit first end by a first included angle. The conduit centerline may be angularly offset from the case structure at the conduit second end by a second included angle that is different than the first included angle.

The first location may be displaced from the second location axially along the axis.

The first location may be displaced from the second location circumferentially about the axis.

At least a portion of the air conduit may have a polygonal cross-sectional geometry.

At least a portion of the air conduit may have an elongated cross-sectional geometry.

The case structure and the air conduit may be formed together as a monolithic body.

The turbine engine assembly may also include an air source and an air cooled component within the case structure. The air conduit may be configured to receive air from the air source and direct the received air to the air cooled component.

The air source may be configured as or otherwise include a compressor section of the turbine engine. In addition or alternatively, the air cooled component may be configured as or otherwise include a turbine vane.

The turbine engine assembly may also include a stator vane with one or more internal passages. The air conduit may be fluidly coupled with the one or more internal passages.

The turbine engine assembly may also include a second air conduit within the case structure. The second air conduit may extend radially across a flowpath of the turbine engine. The second air conduit may be fluidly coupled with and downstream of the air conduit.

The air conduit may be fluidly coupled with a bleed orifice in the case structure at the conduit first end.

The turbine engine assembly may also include a scoop connected to the case structure. The scoop may project into a flowpath of the turbine engine. The air conduit may be fluidly coupled with and downstream of the scoop.

The conduit first end may be an upstream end of the air conduit. The conduit second end may be a downstream end of the air conduit. A maximum displacement between the case structure and the air conduit may be longitudinally along the conduit centerline closer to the conduit second end than the conduit first end.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
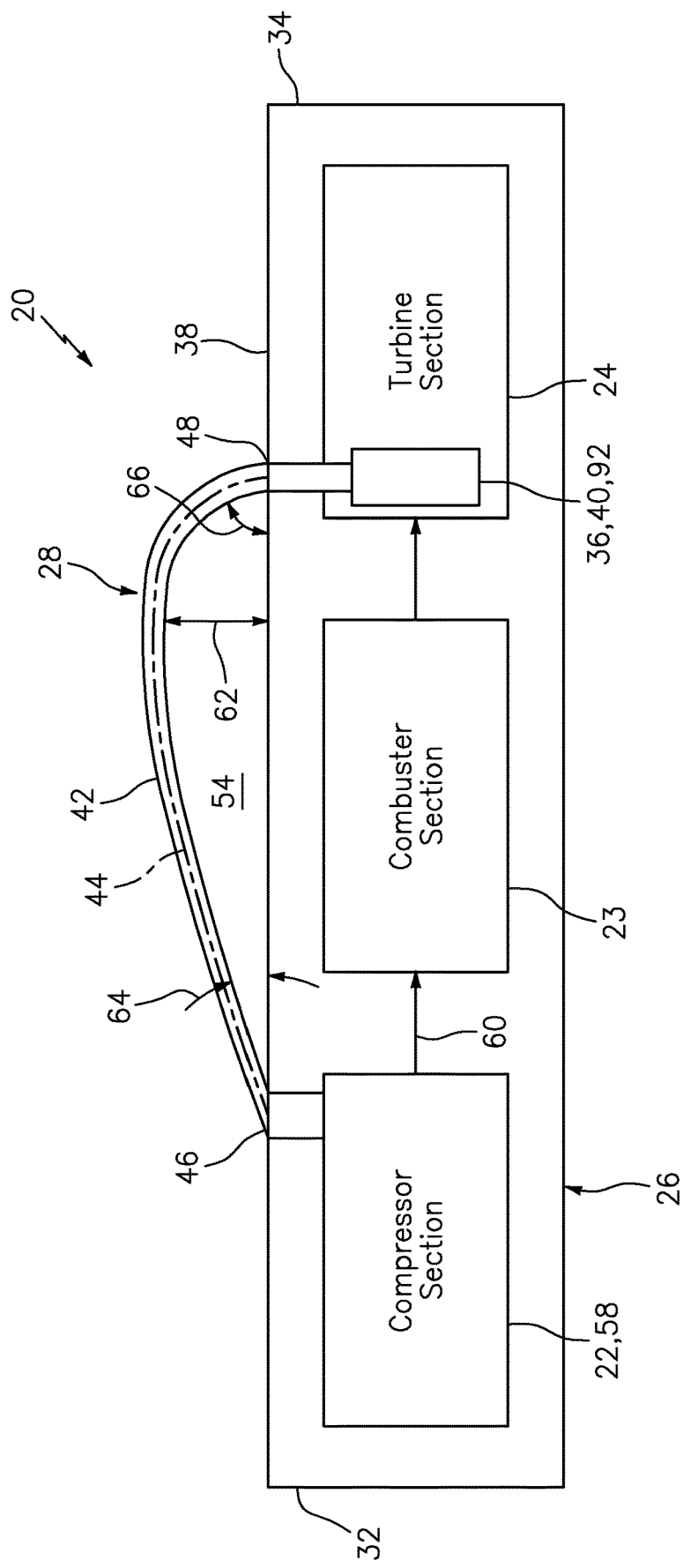
FIG. 1 is a schematic illustration of a gas turbine engine.

FIG. 1 is a schematic illustration of a gas turbine engine 20. This turbine engine 20 includes a compressor section 22, a combustor section 23 and a turbine section 24. The turbine engine 20 also includes a turbine engine case structure 26 and an air cooling system 28.

Figure 2:
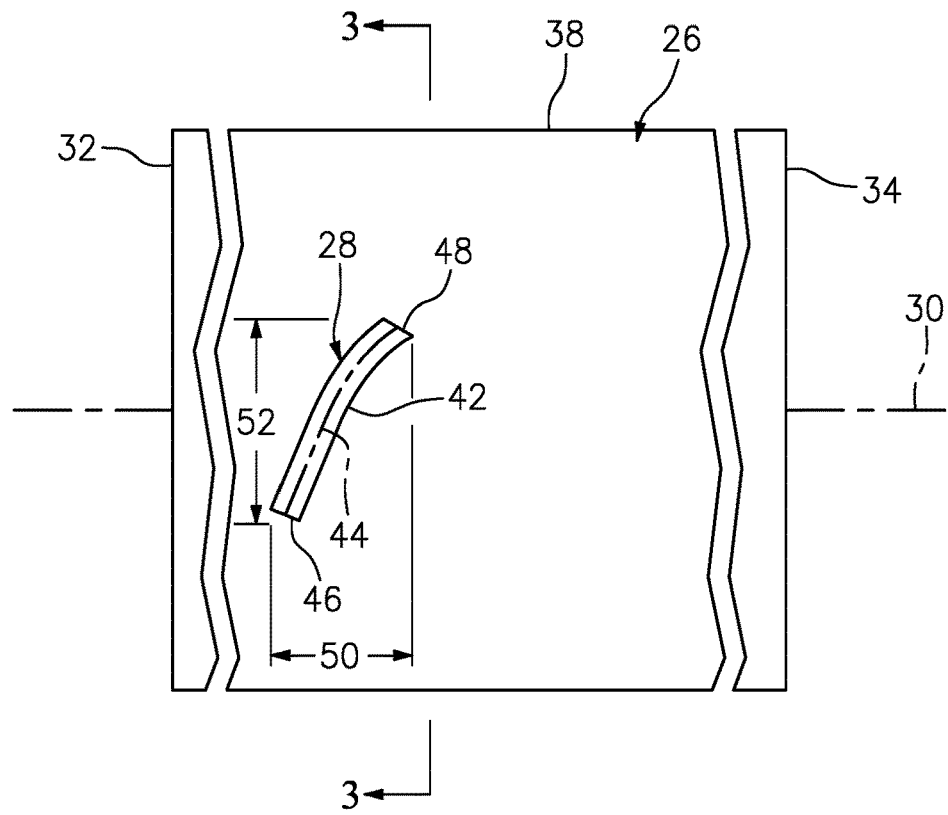
FIG. 2 is a partial schematic illustration of a turbine engine case structure configured with an air cooling system.
Figure 3:
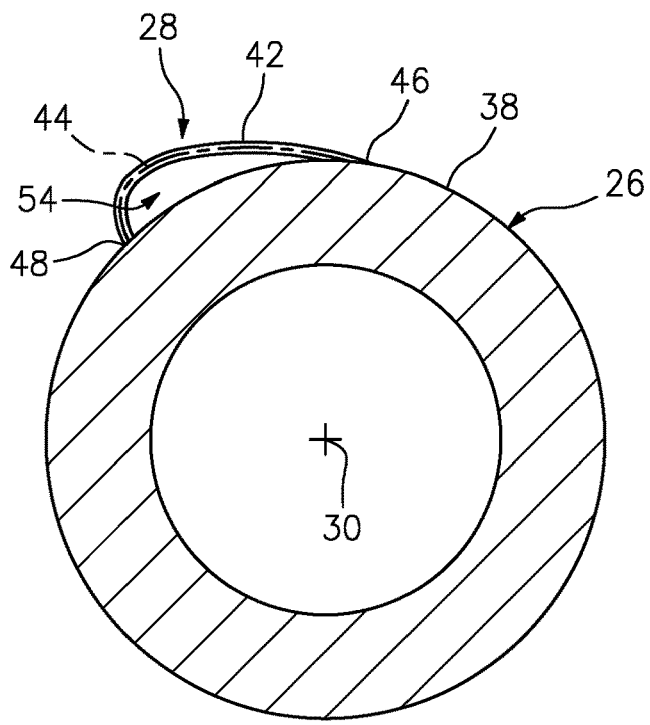
FIG. 3 is a schematic cross-sectional illustration of the case structure and the cooling system taken along line 3-3 in FIG. 2.

The case structure 26 is configured to at least partially or completely house and/or support any one or more or all of the turbine engine sections 22-24. Referring to FIG. 2, the case structure 26 has a centerline axis 30, a case first end 32 (e.g., an upstream and/or forward end) and a case second end 34 (e.g., a downstream and/or aft end). The case structure 26 of FIG. 2 extends axially along its centerline axis 30 between and to the case first end 32 and the case second end 34. Referring to FIG. 3, the case structure 26 extends circumferentially about the centerline axis 30. The case structure 26 of FIG. 3, for example, extends completely around the centerline axis 30 thereby providing the case structure 26 with a full-hoop, tubular body.

The cooling system 28 of FIG. 1 is configured to cool at least one air cooled component 36 of the turbine engine 20. The air cooled component 36 of FIG. 1 is arranged radially within an (e.g., tubular) outer casing wall 38 of the case structure 26. For ease of description, the air cooled component 36 may be described below as a stator vane array 40; e.g., a turbine inlet nozzle, a combustor outlet nozzle, etc. The present disclosure, however, is not limited to such an exemplary air cooled component. For example, in other embodiments, the cooling system 28 may also or alternatively be configured for cooling a turbine engine wall (e.g., a combustor wall, a liner wall, a shroud, a blade outer air seal (BOAS), etc.), a turbine engine rotor blade (e.g., a turbine blade) or any other component within the turbine engine 20 which may utilize air cooling.

Referring to FIGS. 2 and 3, the cooling system 28 includes at least one (e.g., exterior) air conduit 42; e.g., a pipe, a duct, etc. The air conduit 42 has a conduit centerline 44, a conduit first end 46 (e.g., an upstream end) and a conduit second end 48 (e.g., a downstream end). The air conduit 42 extends longitudinally along its conduit centerline 44 between and to the conduit first end 46 and the conduit second end 48. The conduit first end 46 is connected to the case structure 26 and its outer casing wall 38 at a first location. The conduit second end 48 is connected to the case structure 26 and its outer casing wall 38 at a second location. Referring to FIG. 2, the second location may be axially displaced from the first location along the centerline axis 30 by an axial distance 50. The second location may also or alternatively be circumferentially displaced from the first location about the centerline axis 30 by a circumferential distance 52. This circumferential distance 52 may be different (e.g., greater or less) than or equal to the axial distance 50.

The air flowing within the turbine engine 20 may have swirl. More particularly, in addition to flowing axially and/or radially within the turbine engine 20 (e.g., along a flowpath), the air may also flow circumferentially (e.g., clockwise or counter-clockwise) about the centerline axis 30. In order to preserve circumferential momentum, the second location of the conduit second end 48 may be positioned circumferentially relative to the first location of the conduit first end 46 such that the air conduit 42 and its conduit centerline 44 are substantially (e.g., +/−10 degrees) or exactly parallel with the air bled from the compressor section 22; the air source 58. The present disclosure, however, is not limited to such an exemplary configuration.

Figure 4:
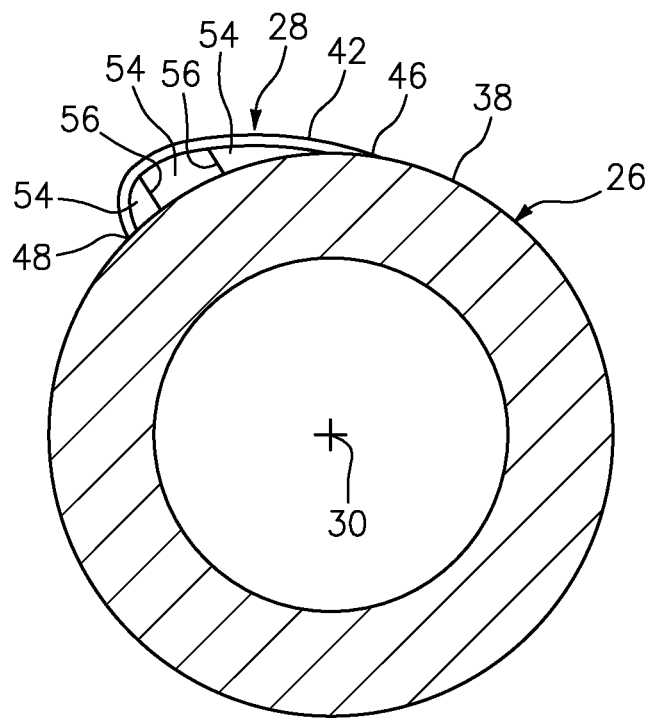
FIG. 4 is a schematic cross-sectional illustration of the case structure and the cooling system configured with one or more supports.

The air conduit 42 may be arranged radially outboard of the outer casing wall 38. The air conduit 42 of FIG. 3, for example, is radially displaced from the case structure 26 and its outer casing wall 38 longitudinally between the conduit first end 46 and the conduit second end 48. In particular, at least an intermediate portion or an entirety of the air conduit 42 (longitudinally along its centerline 44 between the conduit ends 46 and 48) is spatially separated from the case structure 26 and its outer casing wall 38 by a (e.g., air) gap 54. Thus, longitudinally along the conduit centerline 44 between the conduit ends 46 and 48, the air conduit 42 may be completely self-supported. Of course, in other embodiments, the air conduit 42 may be structurally tied to the case structure 26 and its outer casing wall 38 by one or more supports 56 (e.g., stanchions, struts, etc.) as shown, for example, in FIG. 4.

Referring to FIG. 1, the air conduit 42 is configured to receive air (e.g., compressed air) from an air source 58 and then direct that received air to the stator vane array 40; the air cooled component 36. For ease of description, the air source 58 may be described below as the compressor section 22 of the turbine engine 20. The present disclosure, however, is not limited to such an exemplary air source. For example, in other embodiments, the air source 58 may alternatively be a diffuser passage 60 from the compressor section 22 to the combustor section 23.

The air conduit 42 is configured to preserve of momentum of the air received (e.g., bled) from the compressor section 22 and directed towards the stator vane array 40. The air conduit 42 of FIG. 1, for example, is configured to soar over an exterior of the case structure 26 and its outer casing wall 38 and then dive to the case structure 26 and its outer casing wall 38 towards the stator vane array 40. With such a configuration, the cooling system 28 can utilize (e.g., bleed) less air for cooling the stator vane array 40 and, thus, increase efficiency of the turbine engine 20.

At least a major portion (e.g., more than fifty percent (50%)) of the air conduit 42 and its centerline 44 follows a non-straight trajectory. For example, at least sixty percent (60%), seventy percent (70%), eighty percent (80%) or more (e.g., an entirety) of the air conduit 42 and its centerline 44 may follow a continuously curved trajectory, a splined trajectory, an arcuate trajectory or any other non-straight trajectory from the conduit first end 46 and to the conduit second end 48. At least a portion or an entirety of the non-straight trajectory may have a variable radius. Thus, a maximum (e.g., radial) displacement 62 between (a) the case structure 26 and its outer casing wall 38 and (b) the air conduit 42 may be, longitudinally along the conduit centerline 44, closer to the conduit second end 48 than the conduit first end 46. For example, a location of the maximum displacement 62 may be in a last/downstream-most one-half (½), two-fifths (⅖) or one-third (⅓) of the air conduit 42. With such a configuration, the air conduit 42 may dive to the conduit second end 48.

The air conduit 42 is angularly offset from the case structure 26 and its outer casing wall 38 by a (e.g., acute) first included angle 64 at the conduit first end 46. The air conduit 42 is angularly offset from the case structure 26 and its outer casing wall 38 by a (e.g., acute) second included angle 66 at the conduit second end 48. The second included angle 66 of FIG. 1 is different (e.g., greater) than the first included angle 64.

Figures 5A, 5B, 5C:
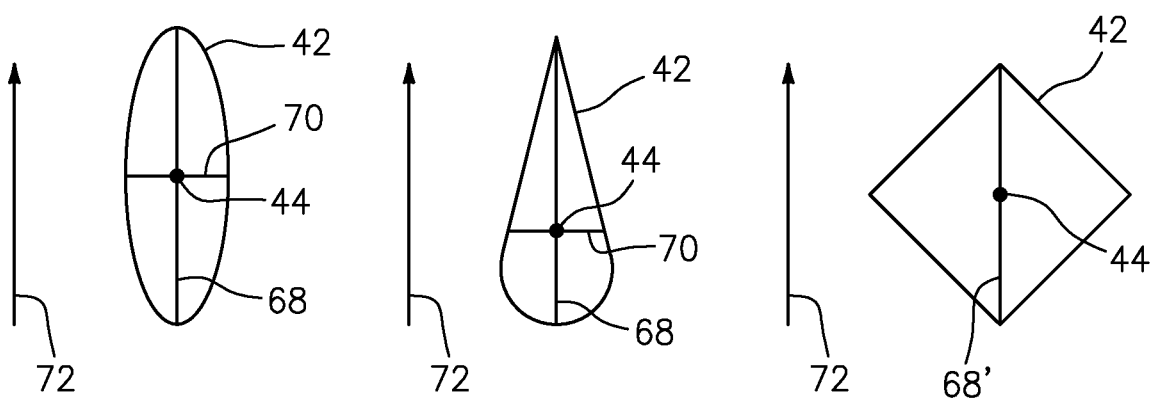
FIGS. 5A-C are schematic cross-sectional illustrations of various air conduit cross-sectional shapes.

Referring to FIGS. 5A-5C, at least a portion or an entirety of the air conduit 42 may have a (e.g., interior and/or exterior) non-circular cross-sectional geometry when viewed, for example, in a plane perpendicular to the conduit centerline 44. Referring to FIGS. 5A and 5B, the non-circular cross-sectional geometry may have an elongated shape with a major axis 68 and a minor axis 70. For example, referring to FIG. 5A, the non-circular cross-sectional geometry may have an oval shape, an elliptical shape or a race-track shape. In another example, referring to FIG. 5B, the non-circular cross-sectional geometry may have a teardrop shape. Referring to FIG. 5C, the non-circular cross-sectional geometry may also or alternatively have polygonal shape. The non-circular cross-sectional geometry of FIG. 5C, for example, may have a diamond shape or square shape. The present disclosure, however, is not limited to the foregoing exemplary air conduit cross-sectional geometries.

While the present disclosure is not limited to any particular air conduit cross-sectional geometry, the air conduit cross-sectional geometries described above may be particularly useful where the air conduit 42 is manufactured via, for example, additive manufacturing. The above described air conduit cross-sectional geometries, for example, may facilitate forming the air conduit 42 without any internal support structures (e.g., support structures within a bore of the air conduit 42) and/or reduce or minimize inter-layer overhangs during additive manufacture. During additive manufacture, the air conduit 42 may be arranged such that, for example, the major axis 68 or a diagonal 68' of the air conduit cross-sectional geometry is substantially (e.g., +/−10 degrees) or exactly parallel with a layer-by-layer build direction 72.

Figure 6A:
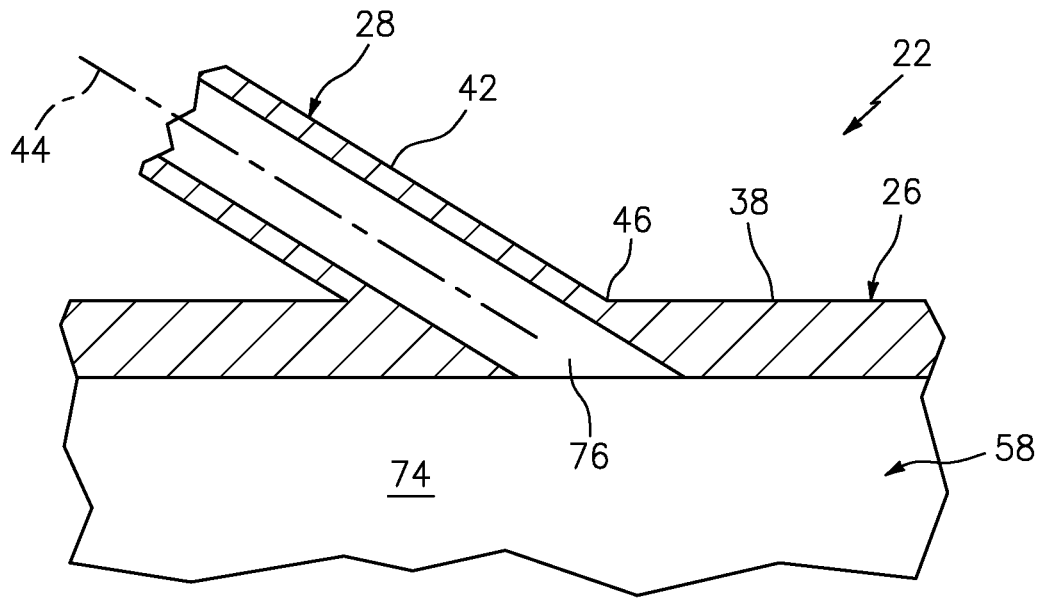
FIGS. 6A and 6B are partial sectional illustrations of various interfaces between the air conduit, the case structure and a flow path.
Figure 6B:
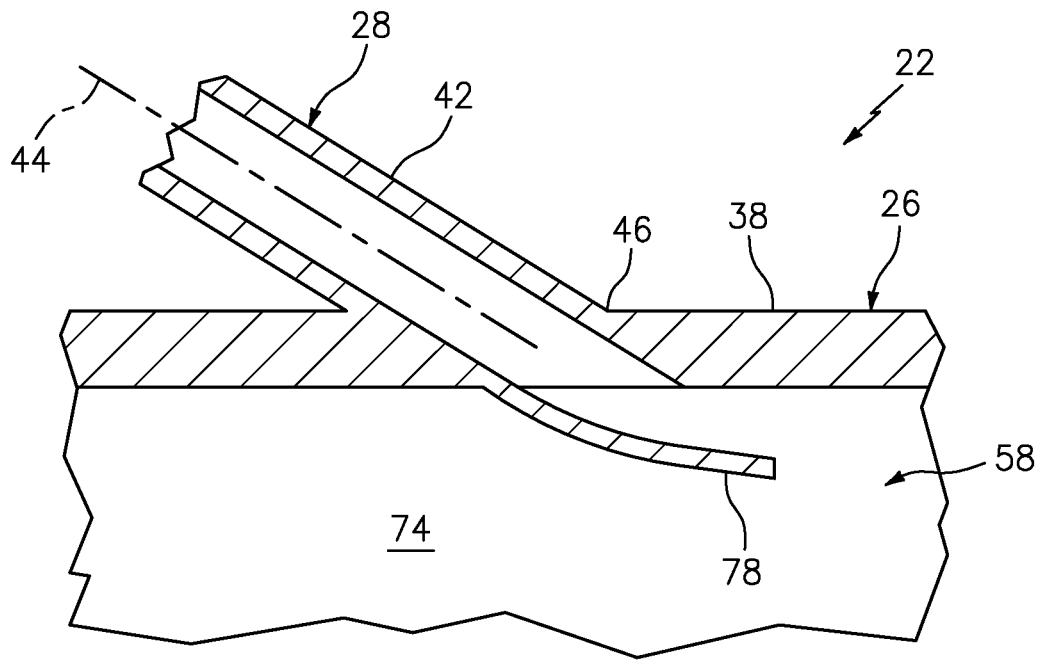

Referring to FIG. 6A, the air conduit 42 and its first end 46 may be fluidly coupled with a flowpath 74 (e.g., a core gas path) within the compressor section 22 through a bleed aperture 76; e.g., orifice, through-hole, etc. The bleed aperture 76 of FIG. 6A is disposed in and extends through the case structure 26 and its outer casing wall 38. Alternatively, referring to FIG. 6B, the air conduit 42 and its first end 46 may be fluidly coupled with the flowpath 74 through an air scoop 78. The air scoop 78 of FIG. 6B is connected to the case structure 26 and its outer casing wall 38 and projects into the flowpath 74.

Figure 7A:
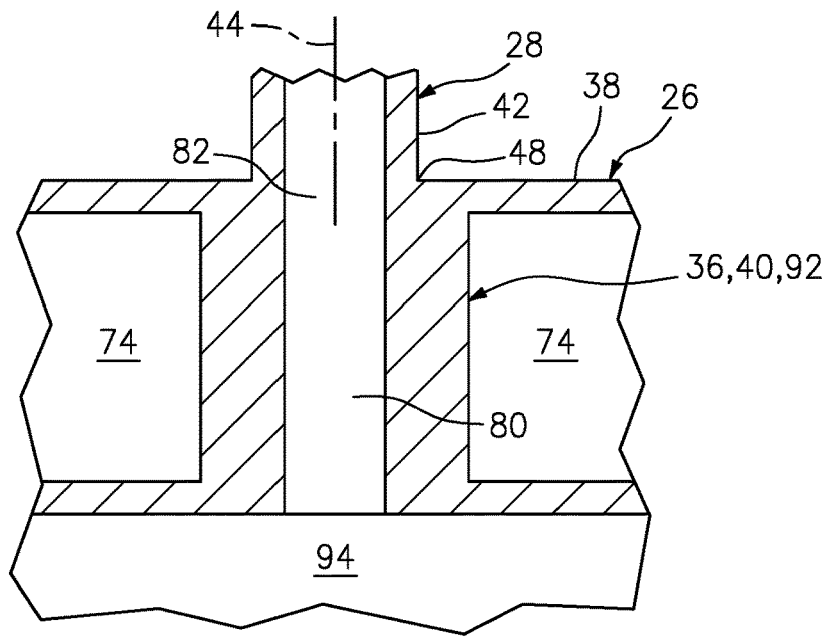
FIGS. 7A and 7B are partial sectional illustration of various connections between the air conduit and an air cooled component of the turbine engine.
Figure 7B:
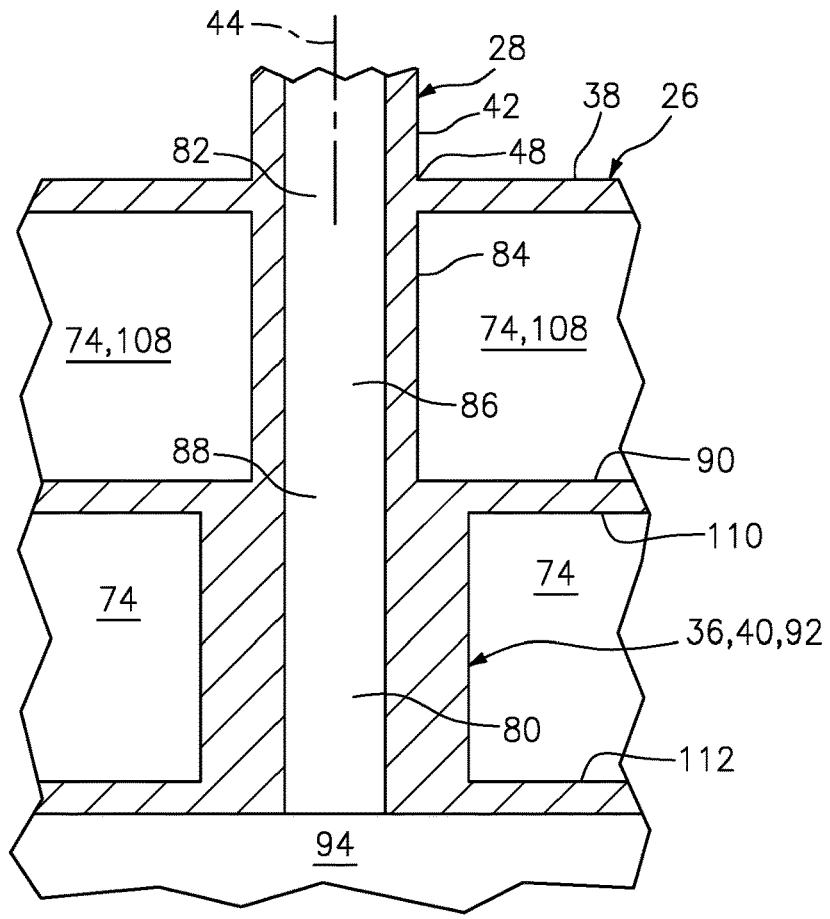

Referring to FIG. 7A, the air conduit 42 and its second end 48 may be fluidly coupled with at least one internal passage 80 of the stator vane array 40 (e.g., directly) through an aperture 82 in the case structure 26/the outer casing wall 38. Alternatively, referring to FIG. 7B, the air conduit 42 and its second end 48 may be fluidly coupled with the at least one internal passage 80 of the stator vane array 40 (e.g., indirectly) through at least one intermediate structure 84 and/or another portion of the case structure 26 (or another structure). For example, the air conduit 42 may be fluidly coupled, in serial, with the aperture 82 in the outer casing wall 38, at least one internal passage 86 of the intermediate structure 84, an aperture 88 in an inner casing wall 90 of the case structure 26, and the at least one internal passage 80 of the stator vane array 40. The intermediate structure 84 may be an internal air conduit exposed to the flowpath 74. This internal air conduit may have a similar geometry to the external air conduit 42. Alternatively, the internal air conduit may have a cross-sectional geometry with an airfoil shape or another aerodynamic shape. The internal air conduit may extend radially across (e.g., a diffuser portion of) the flowpath 74 between and to the casing walls 38 and 90. Alternatively, the intermediate structure 84 may be another stator vane array (e.g., a diffuser vane array) or a stator vane thereof with one or more internal passages (e.g., 86).

Figure 8:
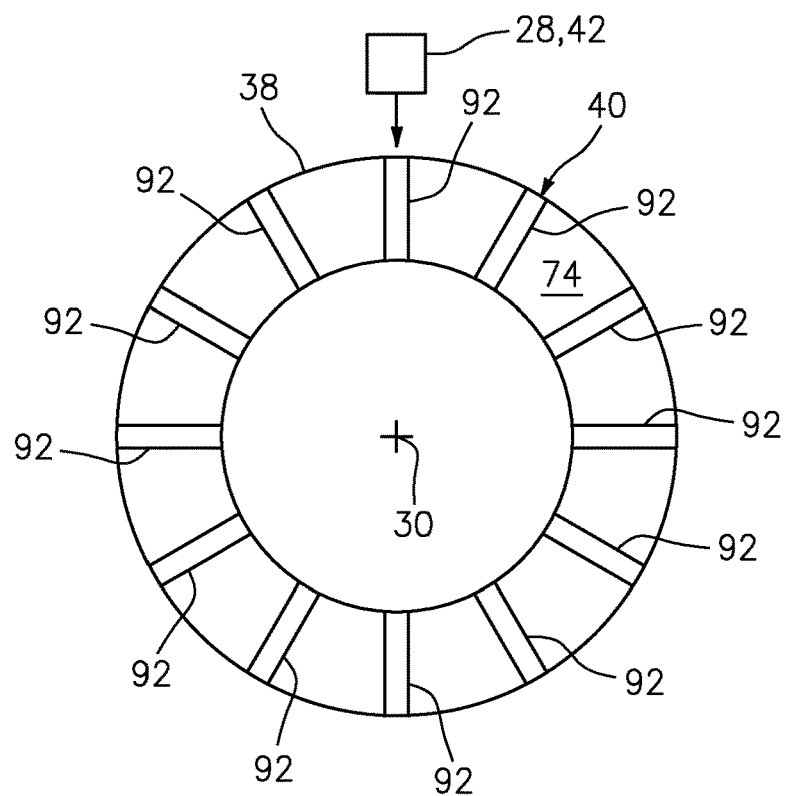
FIG. 8 is a schematic cross-sectional illustration of the case structure and the cooling system.

Referring to FIG. 8, the stator vane array 40 includes a plurality of stator vanes 92; e.g., turbine vanes. These stator vanes 92 are arranged circumferentially about the centerline axis 30 in an annular array. At least one (or only one) of the stator vanes 92 is hollow and fluidly coupled with/receives the cooling air from the air conduit 42.

Figures 9A, 9B:
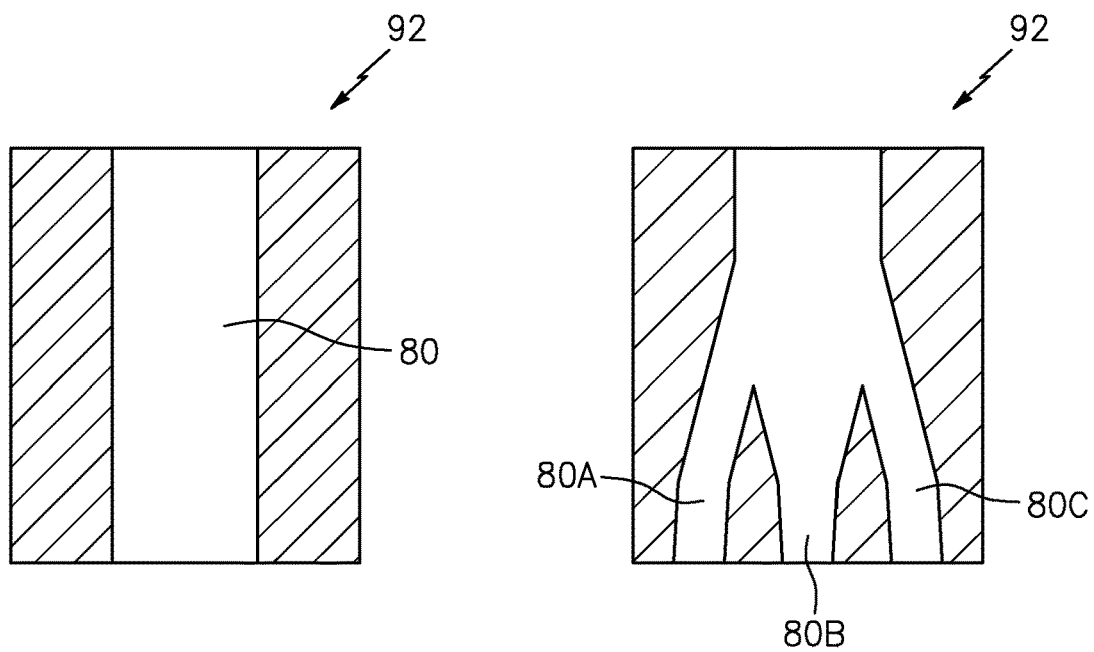
FIGS. 9A and 9B are sectional illustrations of various internal passage configurations for the air cooled component.

Referring to FIG. 9A, the at least one stator vane 92 may be configured with a single internal passage 80 fluidly coupled with and downstream of the air conduit 42 (see FIG. 8). However, referring to FIG. 9B, the at least one stator vane 92 may be configured with a plurality of (e.g., parallel) internal passages 80A, 80B and 80C (generally referred to as "80") (e.g., branches, capillaries, etc.) fluidly coupled with and downstream of the air conduit 42 (see FIG. 8).

The internal passage(s) 80 in the at least one stator vane 92 may be configured to provide the cooling air to another downstream volume 94 (see FIGS. 7A and 7B); e.g., a cavity or passage. Each internal passage 80, for example, may extend radially through (or out of) the respective stator vane 92. The present disclosure, however, is not limited to the above exemplary internal passage configurations.

Figure 10:
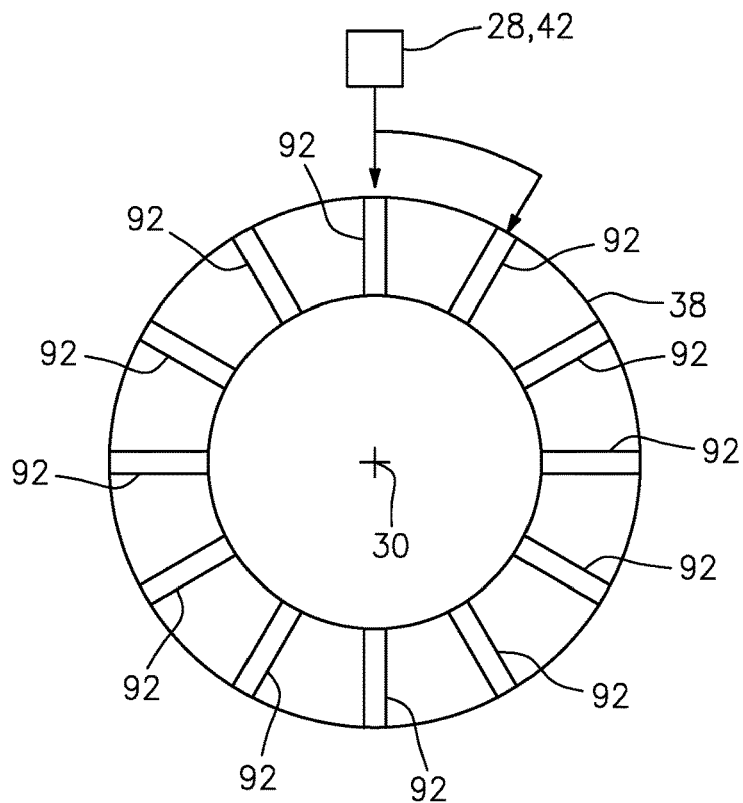
FIG. 10 is a schematic cross-sectional illustration of the case structure and the cooling system with a single air conduit connected to multiple air cooled components.
Figure 11A:
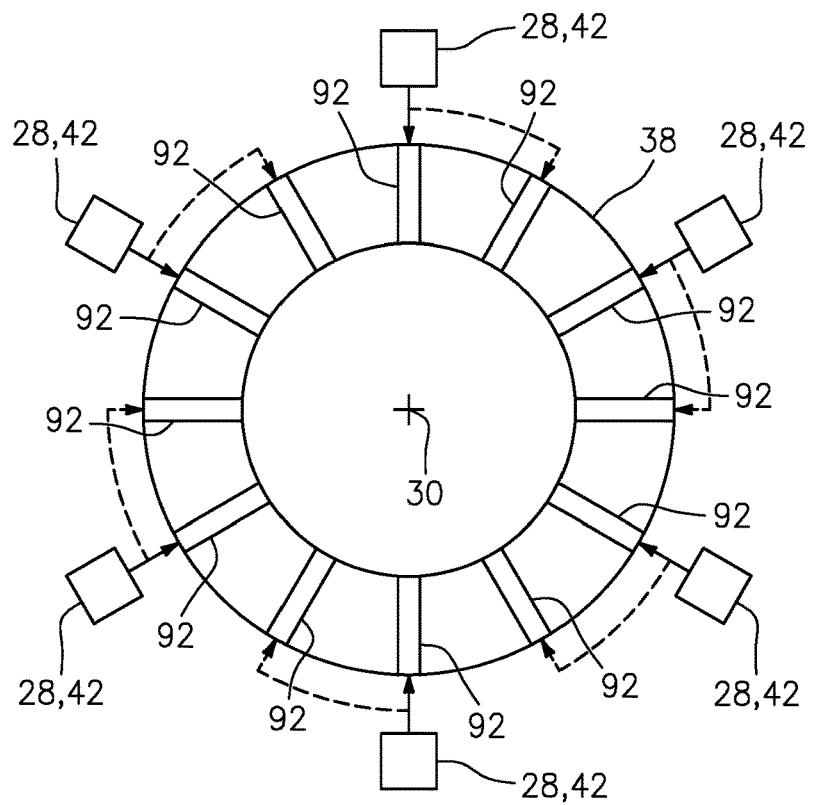
FIGS. 11A and 11B are schematic cross-sectional illustration of the case structure and the cooling system with multiple air conduits connected to multiple air cooled components.
Figure 11B:
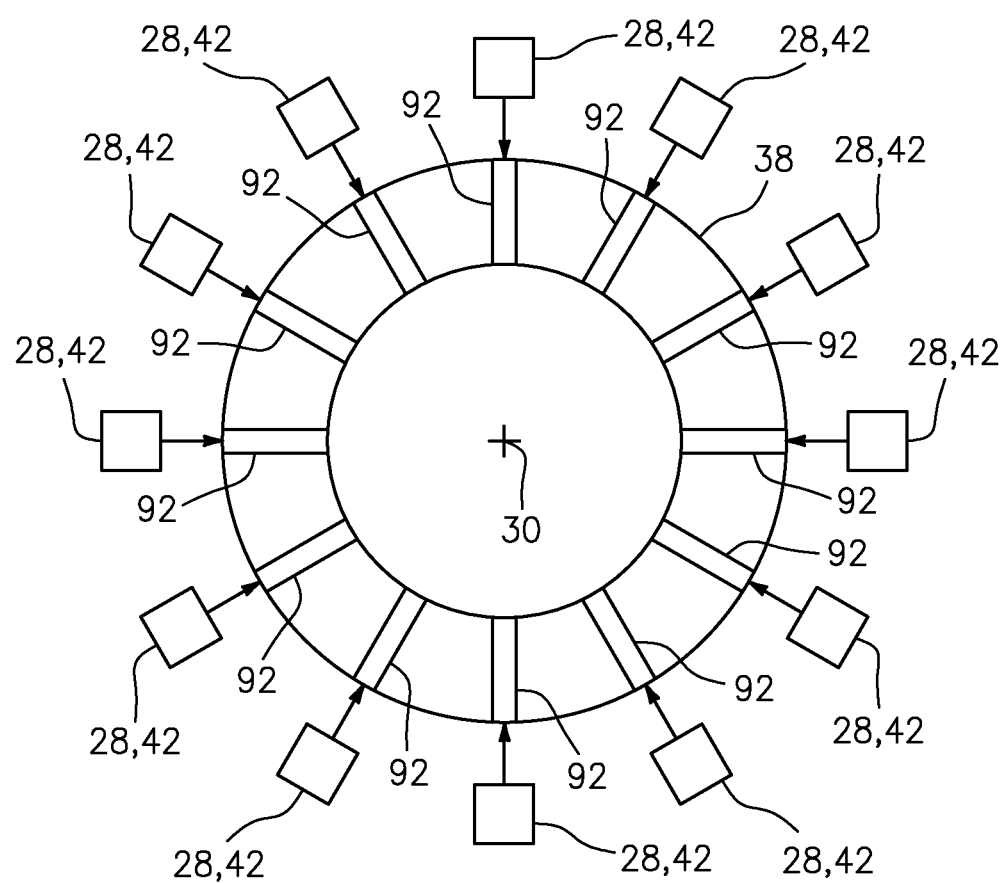

In some embodiments, referring to FIGS. 8 and 10, the turbine engine 20 may include a single air conduit 42 external to the case structure 26 and its outer casing wall 38. This single air conduit 42 may service a single one of the stator vanes 92 (e.g., see FIG. 8), some of the stator vanes 92 (see FIG. 10) or each of the stator vanes 92. Alternatively, each stator vane 92, or a subset (e.g., every other one) of the stator vanes 92, may be configured with its own respective air conduit 42. For example, referring to FIGS. 11A and 11B, the cooling system 28 includes a plurality of the air conduits 42 external to the case structure 26. Each of these air conduits 42 is respectively fluidly coupled with a respective one of the stator vanes 92 in the stator vane array 40. In the embodiment of FIG. 11A, a subset of the stator vanes 92 in the stator vane array 40 are cooled by air from the respective air conduits 42. In the embodiment of FIG. 11B, each of the stator vanes 92 in the stator vane array 40 is cooled by air from a respective one of the air conduits 42. Of course, in still other embodiments, the turbine engine 20 may include a plurality of the air conduits 42, where each air conduit 42 may service multiple stator vanes 92 (e.g., see optional dashed lines in FIG. 11A). The present disclosure, of course, is not limited to the foregoing exemplary pairings/configurations of air conduits 42 and stator vanes 92.

Figure 12:
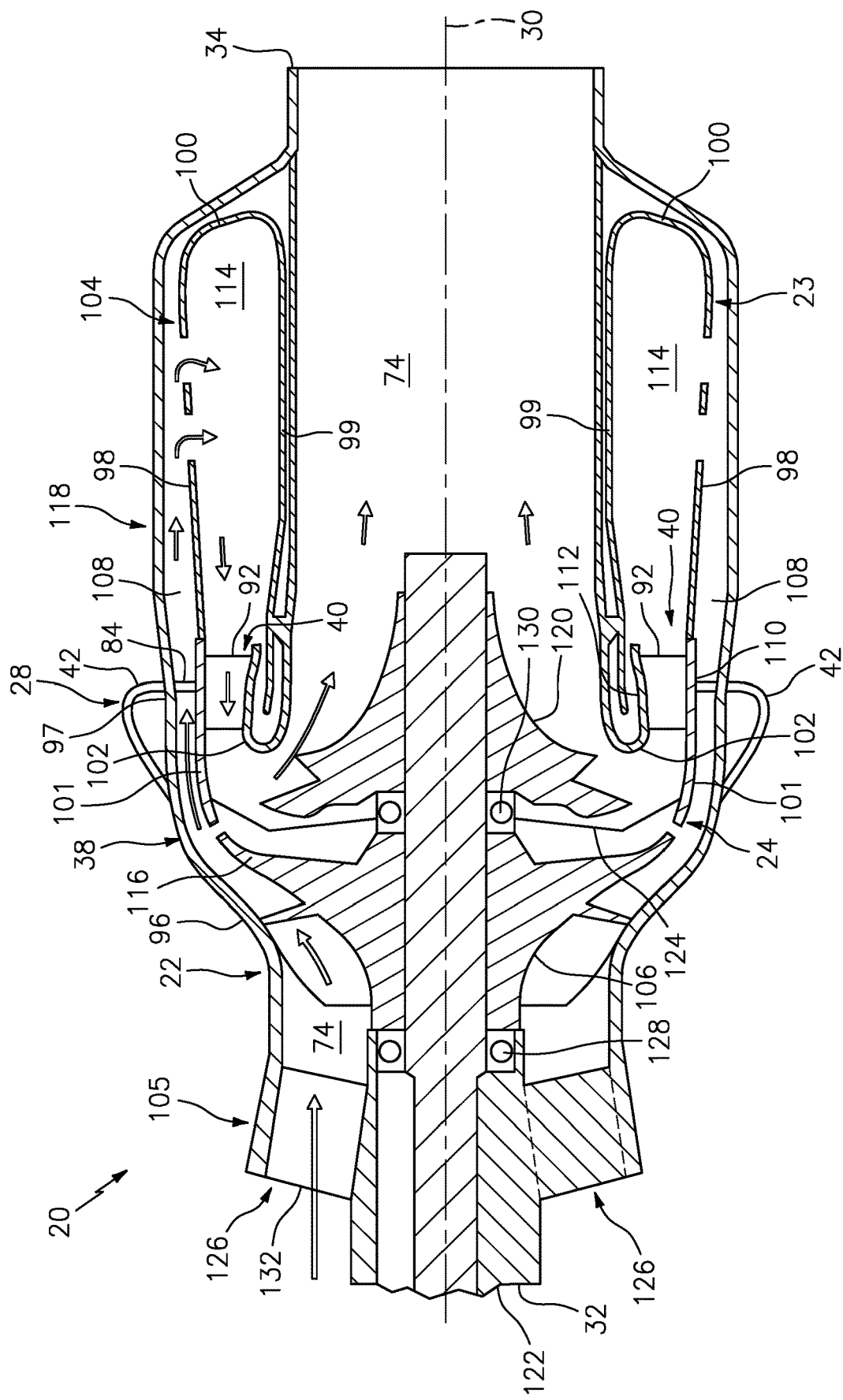
FIG. 12 is a partial schematic sectional illustration of the turbine engine.

Referring to FIG. 12, the case structure 26 may include a plurality of walls. The case structure 26 of FIG. 12, for example, includes a compressor wall 96 (e.g., a forward portion of the outer casing wall 38), a diffuser wall 97 (e.g., an aft portion of the outer casing wall 38), an outer combustor wall 98 of a (e.g., annular) combustor 104, an inner combustor wall 99 of the combustor 104, a bulkhead wall 100 of the combustor 104, an outer turbine wall 101 and an inner turbine wall 102. One or more or each of these case walls 96-102 may be generally tubular or generally annular. Each of the case walls 96-99, 101 and 102 of FIG. 12, for example, is tubular, and the bulkhead wall 100 is annular.

The compressor wall 96 extends axially along the centerline axis 30 between and is connected to an inlet section 105 of the turbine engine 20 and the diffuser wall 97. The compressor wall 96 of FIG. 12 circumscribes, axially overlaps and thereby houses a rotor 106 of the compressor section 22.

The diffuser wall 97 extends axially along the centerline axis 30 between and is connected to the compressor wall 96 and an aft end portion of the inner turbine wall 102. The diffuser wall 97 is spaced/displaced radially outboard from and axially overlaps the combustor 104. The diffuser wall 97 of FIG. 12 thereby forms an outer peripheral boundary of a diffuser plenum 108 that surrounds the combustor 104.

The outer combustor wall 98 extends axially along the centerline axis 30 between and may be connected to the bulkhead wall 100 and an outer platform 110 of the stator vane array 40. The inner combustor wall 99 is circumscribed and axially overlapped by the outer combustor wall 98. The inner combustor wall 99 extends axially along the centerline axis 30 between and may be connected to the bulkhead wall 100 and an inner platform 112 of the stator vane array 40. The bulkhead wall 100 extends radially between and is connected to aft end portions of the outer combustor wall 98 and the inner combustor wall 99. The case walls 98-100 may thereby collectively form peripheral boundaries of a (e.g., annular) combustion chamber 114 therebetween.

The outer turbine wall 101 may be connected to the stator vane array platform 110. The outer turbine wall 101 projects axially out from the stator vane array platform 110 and extends axially towards/to an aft, downstream end of an inner platform 116 of the compressor rotor 106. This outer turbine wall 101 is circumscribed and axially overlapped by the diffuser wall 97. The outer turbine wall 101 of FIG. 12 may thereby form an inner peripheral boundary of the flowpath 74 within a diffuser 118 of the turbine engine 20, and may form an outer peripheral boundary of the flowpath 74 within a (e.g., upstream) portion of the turbine section 24. The outer turbine wall 101 of FIG. 12 also circumscribes, axially overlaps and thereby houses a (e.g., upstream) portion of a rotor 120 of the turbine section 24.

The inner turbine wall 102 may be connected to the stator vane array platform 112. An upstream portion of the inner turbine wall 102 projects axially (in an aft-to-forward direction) out from the stator vane array platform 112 to a turning portion of the inner turbine wall 102. A downstream portion of the inner turbine wall 102 projects axially (in a forward-to-aft direction) away from the inner turbine wall turning portion to an outlet of the turbine section 24 at the case second end 34. The inner turbine wall 102 is circumscribed and axially overlapped by the combustor 104. The inner turbine wall 102 is also spaced/displaced radially inboard from the combustor 104. The inner turbine wall 102 of FIG. 12 thereby forms an inner peripheral boundary of the diffuser plenum 108 that surrounds the combustor 104. The inner turbine wall 102 forms an outer peripheral boundary of the core flowpath 74 within a (e.g., downstream) portion of the turbine section 24. The inner turbine wall 102 of FIG. 12 also circumscribes, axially overlaps and thereby houses a (e.g., downstream) portion of the turbine rotor 120.

The case structure 26 may also include one or more internal support structures with one or more support members. Examples of support members include, but are not limited to, struts, structural guide vanes, bearing supports, bearing compartment walls, etc. The case structure 26 of FIG. 12, for example, includes a forward support structure 122, an aft support structure 124, an inlet nozzle 126 and the stator vane array 40. The forward support structure 122 may be configured to support a shaft bearing 128. The aft support structure 124 may be configured to support another shaft bearing 130. The inlet nozzle 126 may be configured to condition core air entering the compressor section 22. The inlet nozzle 126, for example, may include one or more guide vanes 132 which impart swirl to the core air. The stator vane array 40 may similarly be configured to condition the combustion products exiting the combustor section 23. The stator vanes 92, for example, may import swirl to the combustion products, where these stator vanes 92 are connected to and extend radially between the stator vane array inner and outer platforms 112 and 110. The case structure 26, of course, may also or alternative include various other static/stationary gas turbine engine components.

With the configuration of FIG. 12, cooling air provided to the stator vane(s) 92 may also be provided to cool the stator vane array inner platform 112 and/or a forward/downstream portion of the inner combustor wall 99 before flowing into the combustion chamber 114.

Some or all stationary components (e.g., 26, 42 and 84) of the turbine engine 20 may be formed (e.g., additively manufactured) together as a single monolithic body. The term monolithic may described an apparatus which is formed as a single unitary body. The components (e.g., 26, 38, 42 and/or 92) in FIG. 7A or the components (e.g., 26, 38, 42, 84, 90, 92, 110 and/or 112) in FIG. 7B, for example, may be collectively additively manufactured, cast, machined and/or otherwise formed together as an integral, unitary body. Thus, the cooling system components (e.g., the air conduits 42 and 84) may be configured as part of the case structure 26. By contrast, a non-monolithic body may include parts that are discretely formed from one another, where those parts are subsequently mechanically fastened and/or otherwise attached to one another.

The cooling system 28 and its air conduit(s) 42 may be included in various turbine engines. The cooling system 28 and its air conduit(s) 42, for example, may be included in a geared turbine engine where a gear train connects one or more shafts to one or more rotors in a fan section, a compressor section and/or any other engine section. Alternatively, the cooling system 28 and its air conduit(s) 42 may be included in a turbine engine configured without a gear train. The cooling system 28 and its air conduit(s) 42 may be included in a geared or non-geared turbine engine configured with a single spool (see FIG. 12), with two spools, or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
   a case structure extending circumferentially about and axially along an axis; and
   an air conduit having a conduit centerline, a conduit first end and a conduit second end, the air conduit extending longitudinally along the conduit centerline between the conduit first end and the conduit second end, the conduit first end connected to the case structure at a first location, the conduit second end connected to the case structure at a second location, the air conduit displaced from the case structure longitudinally between the conduit first end and the conduit second end, and at least a majority of the conduit centerline following a non-straight trajectory;
   wherein the case structure and the air conduit are formed together as a monolithic body.

2. The assembly of claim 1, wherein the non-straight trajectory is a continuously curved trajectory.

3. The assembly of claim 1, wherein an entirety of the conduit centerline follows the non-straight trajectory.

4. The assembly of claim 1, wherein
   the conduit centerline is angularly offset from the case structure at the conduit first end by a first included angle; and
   the conduit centerline is angularly offset from the case structure at the conduit second end by a second included angle that is different than the first included angle.

5. The assembly of claim 1, wherein the first location is displaced from the second location axially along the axis.

6. The assembly of claim 1, wherein the first location is displaced from the second location circumferentially about the axis.

7. The assembly of claim 1, wherein at least a portion of the air conduit has a polygonal cross-sectional geometry.

8. The assembly of claim 1, wherein at least a portion of the air conduit has an elongated cross-sectional geometry.

9. The assembly of claim 1, further comprising:
   an air source; and
   an air cooled component within the case structure;
   the air conduit configured to receive air from the air source and direct the received air to the air cooled component.

10. The assembly of claim 9, wherein at least one of
    the air source comprises a compressor section of the turbine engine; and
    the air cooled component comprises a turbine vane.

11. The assembly of claim 1, further comprising:
    a stator vane with one or more internal passages;
    the air conduit fluidly coupled with the one or more internal passages.

12. The assembly of claim 1, further comprising:
    a second air conduit within the case structure;
    the second air conduit extending radially across a flowpath of the turbine engine; and
    the second air conduit fluidly coupled with and downstream of the air conduit.

13. The assembly of claim 1, wherein the air conduit is fluidly coupled with a bleed orifice in the case structure at the conduit first end.

14. The assembly of claim 1, further comprising:
    a scoop connected to the case structure;
    the scoop projecting into a flowpath of the turbine engine; and
    the air conduit fluidly coupled with and downstream of the scoop.

15. An assembly for a turbine engine, comprising:
    a case structure extending circumferentially about and axially along an axis; and
    an air conduit having a conduit centerline, a conduit first end and a conduit second end, the air conduit extending longitudinally along the conduit centerline between the conduit first end and the conduit second end, the conduit first end connected to the case structure at a first location, the conduit second end connected to the case structure at a second location, the air conduit displaced from the case structure longitudinally between the conduit first end and the conduit second end, and at least a majority of the conduit centerline following a non-straight trajectory;
    wherein the conduit first end is an upstream end of the air conduit;
    wherein the conduit second end is a downstream end of the air conduit; and
    wherein a maximum displacement between the case structure and the air conduit is longitudinally along the conduit centerline closer to the conduit second end than the conduit first end.

16. An assembly for a turbine engine, comprising:
    a case structure extending circumferentially about and axially along an axis; and
    an air conduit having a conduit centerline, a conduit first end and a conduit second end, the air conduit extending longitudinally along the conduit centerline from the conduit first end to the conduit second end, the conduit first end connected to the case structure at a first location, and the conduit second end connected to the case structure at a second location that is circumferentially displaced from the first location about the axis, wherein an intermediate portion of the air conduit, longitudinally between the conduit first end and the conduit second end, is radially separated from the case structure;
    wherein the case structure and the air conduit are formed together as a monolithic body.

17. The assembly of claim 16, wherein more than fifty percent of the conduit centerline follows a curved trajectory.

18. The assembly of claim 16, further comprising:
    a compressor section at least partially housed within the case structure; and
    a turbine vane configured with one or more internal passages;
    the air conduit fluidly coupled with and between the compressor section and the one or more internal passages.

* * * * *